Figure 1:
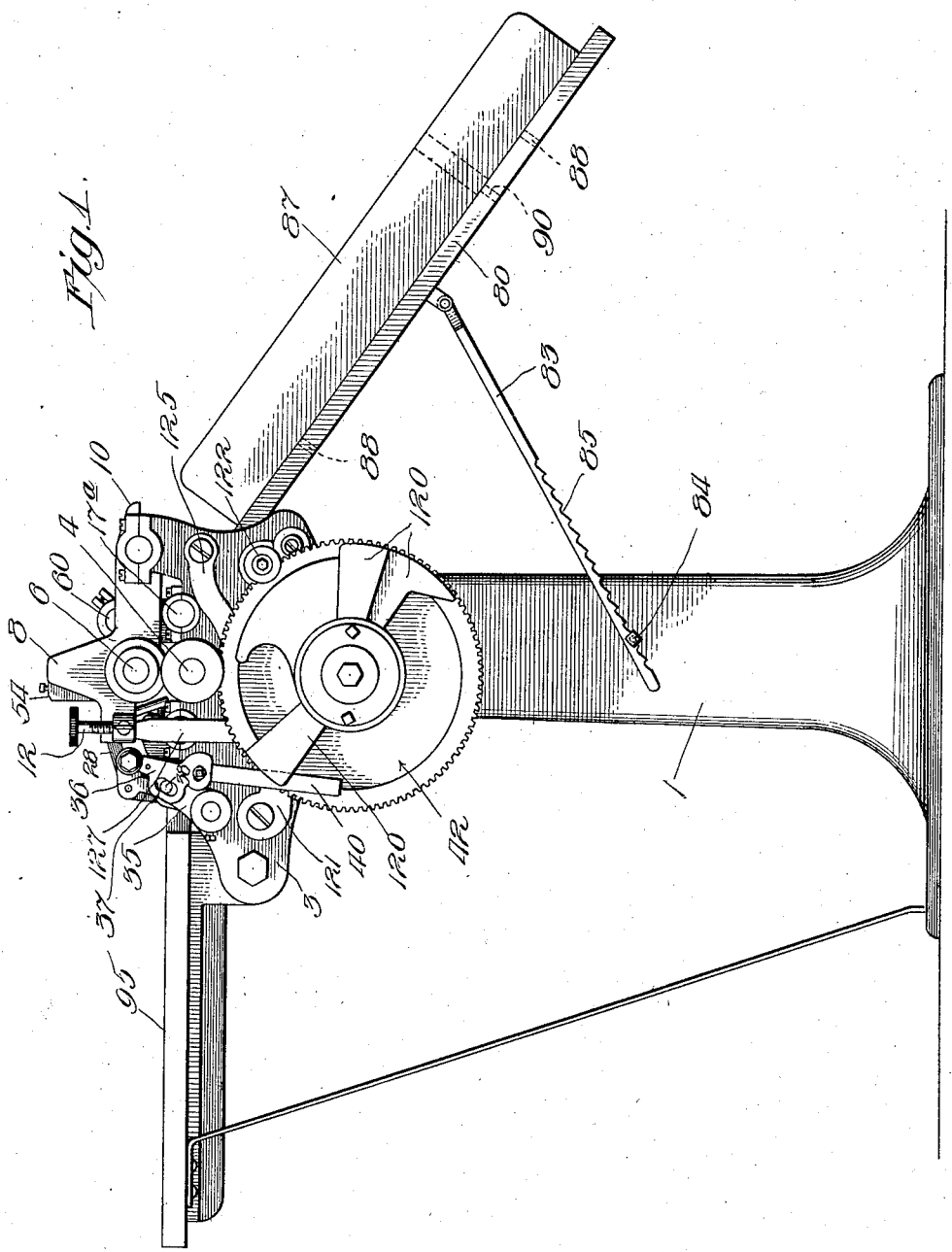

C. A. BURTON.
PERFORATING MACHINE.
APPLICATION FILED JAN. 23, 1912.

1,061,979.

Patented May 20, 1913.
9 SHEETS—SHEET 1.

C. A. BURTON.
PERFORATING MACHINE.
APPLICATION FILED JAN. 23, 1912.

1,061,979.

Patented May 20, 1913.
9 SHEETS—SHEET 4.

Witnesses:

Inventor
Charles A. Burton
by Chamberlin Freudenreich
Attys

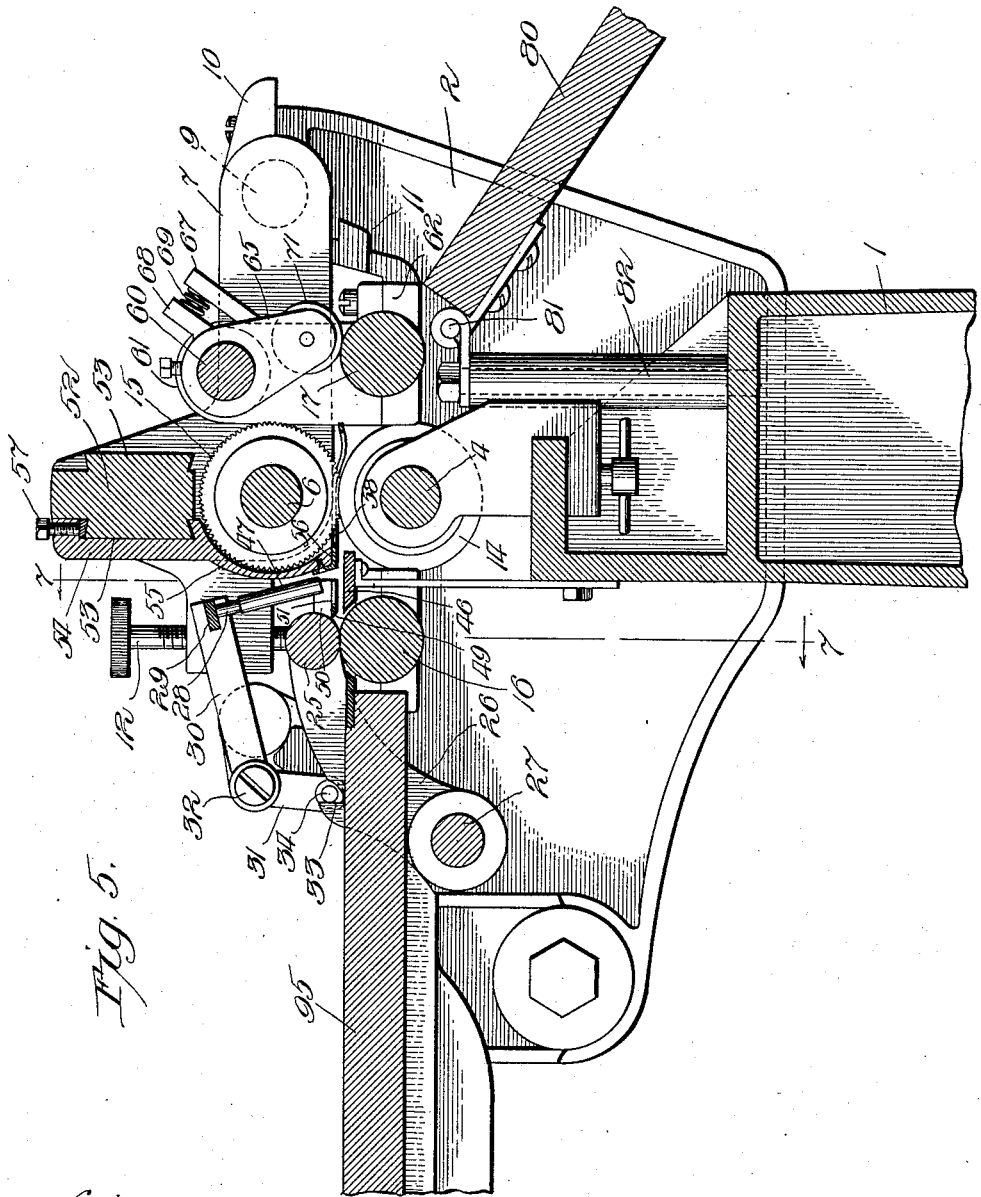

C. A. BURTON.
PERFORATING MACHINE.
APPLICATION FILED JAN. 23, 1912.
1,061,979.
Patented May 20, 1913.
9 SHEETS—SHEET 6.
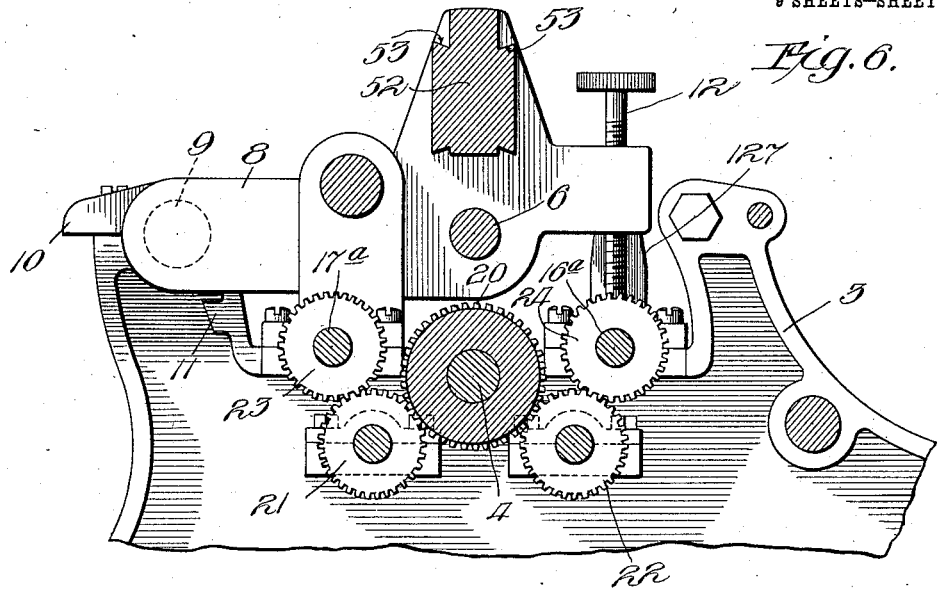
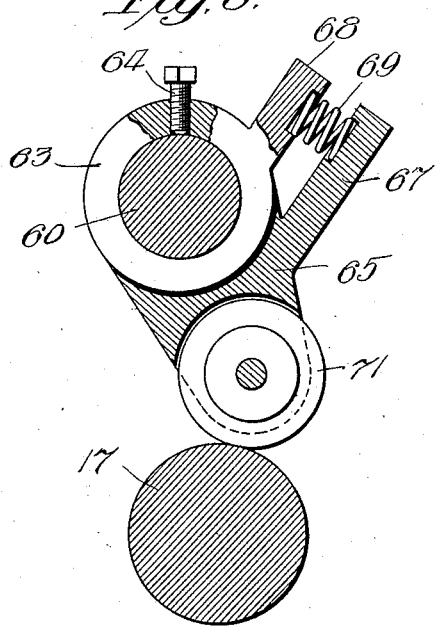
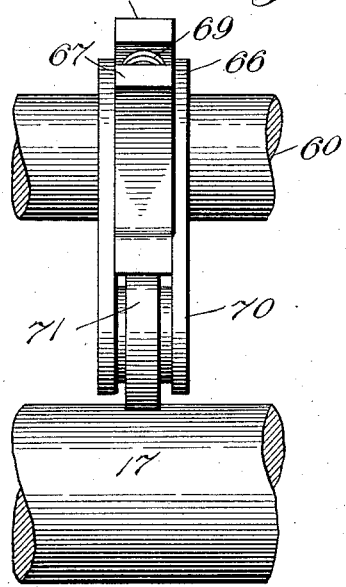
Witnesses:
Inventor
Charles A. Burton,
by Chamberlin & Freudenreich
Attys C. A. BURTON.
PERFORATING MACHINE.
APPLICATION FILED JAN. 23, 1912.
1,061,979.
Patented May 20, 1913.
9 SHEETS—SHEET 7.
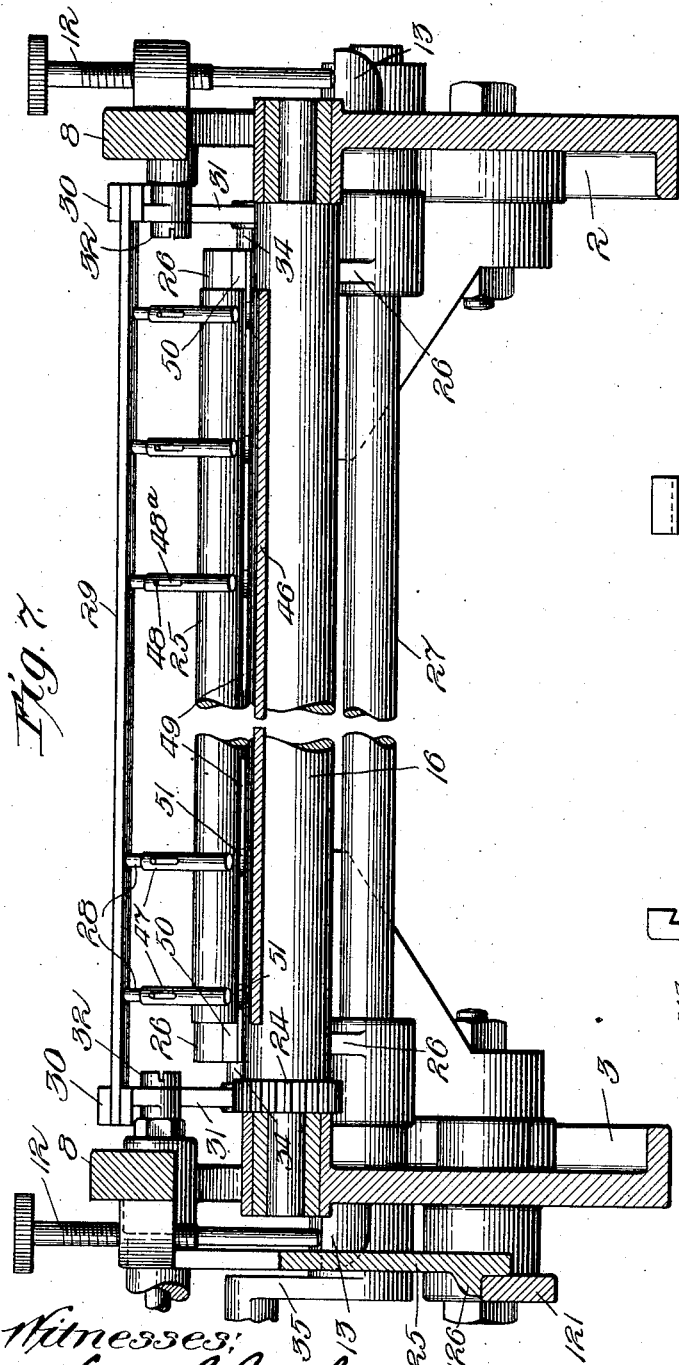

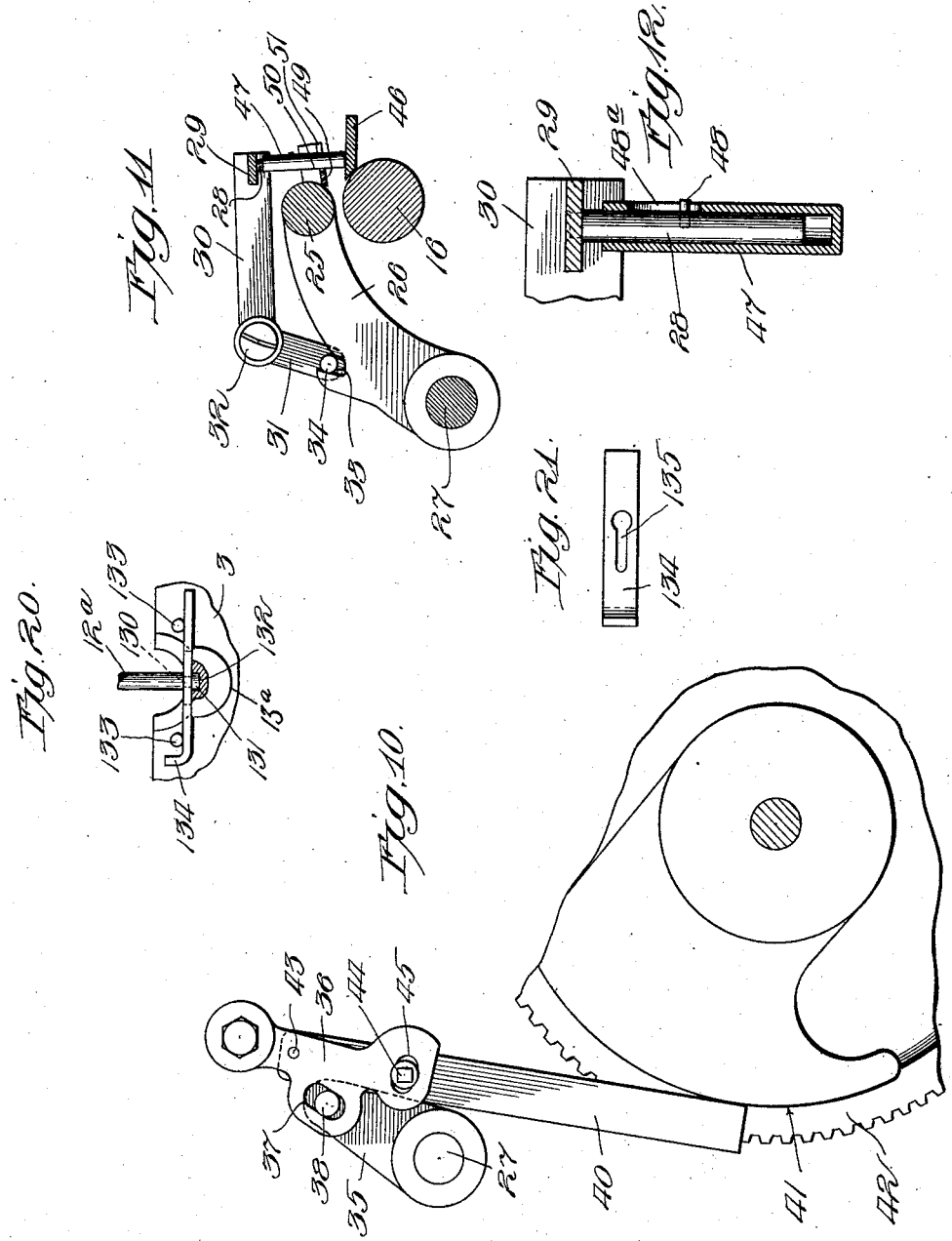

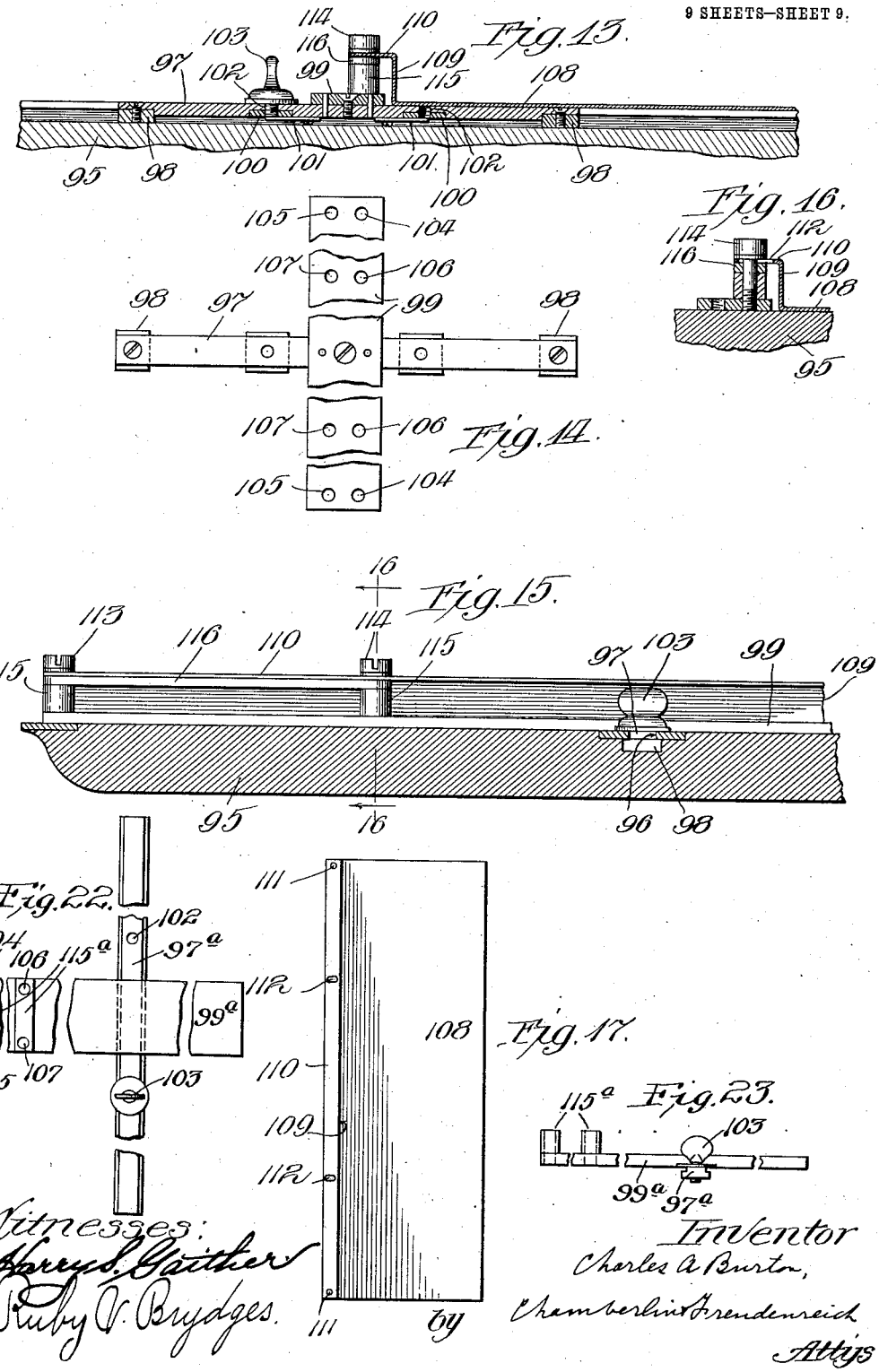

UNITED STATES PATENT OFFICE.

CHARLES A. BURTON, OF CHICAGO, ILLINOIS.

PERFORATING-MACHINE.

1,061,979. Specification of Letters Patent. Patented May 20, 1913.

Application filed January 23, 1912. Serial No. 672,801.

*To all whom it may concern:*

Be it known that I, CHARLES A. BURTON, a citizen of the United States, residing at Chicago, county of Cook, State of Illinois, have invented a certain new and useful Improvement in Perforating-Machines, and declare the following to be a full, clear, and exact description of the same, such as will enable others skilled in the art to which it pertains to make and use the same, reference being had to the accompanying drawings, which form a part of this specification.

Generally speaking my invention relates to machines for perforating or creasing paper, such as illustrated in Patent 323,295 dated July 28, 1885, and has for its object to improve the construction and mode of operation of the same.

One of the objects of my invention, specifically considered, is to improve the construction and operation of the gage against which the paper is fed for the purpose of determining the point at which the perforations shall begin. Subsidiary to this object other objects are to simplify and improve the means for throwing the gage out of operation when desired and to improve the controlling means for the primary feed rolls.

A further object of my invention is to provide means for insuring a satisfactory tension on the paper at all times while it is passing through the machine.

A further object of my invention is to improve the feed table so as to afford an adjustable guide which may be set to compensate for an imperfection in the ruling of the paper to be perforated or creased.

A further object of my invention is to provide a novel and efficient stripping device for stripping the perforated paper from the cutter.

A further object of my invention is to provide novel means for supporting cutters or creasing members so that they may be raised and lowered during the operation of the machine for the purpose of leaving unperforated intervals between perforated portions; be locked in perforating or creasing position; and be capable of being swung into and held in a convenient position for adjusting or changing the cutters or creasing members.

A further object of my invention is to produce a novel arrangement for smoothing the bur formed on the paper passing through the perforating device.

A further object of my invention is to produce a novel "lay boy" or member for receiving the paper which has been acted upon, so as to accommodate paper of various lengths and widths.

Figure 2:
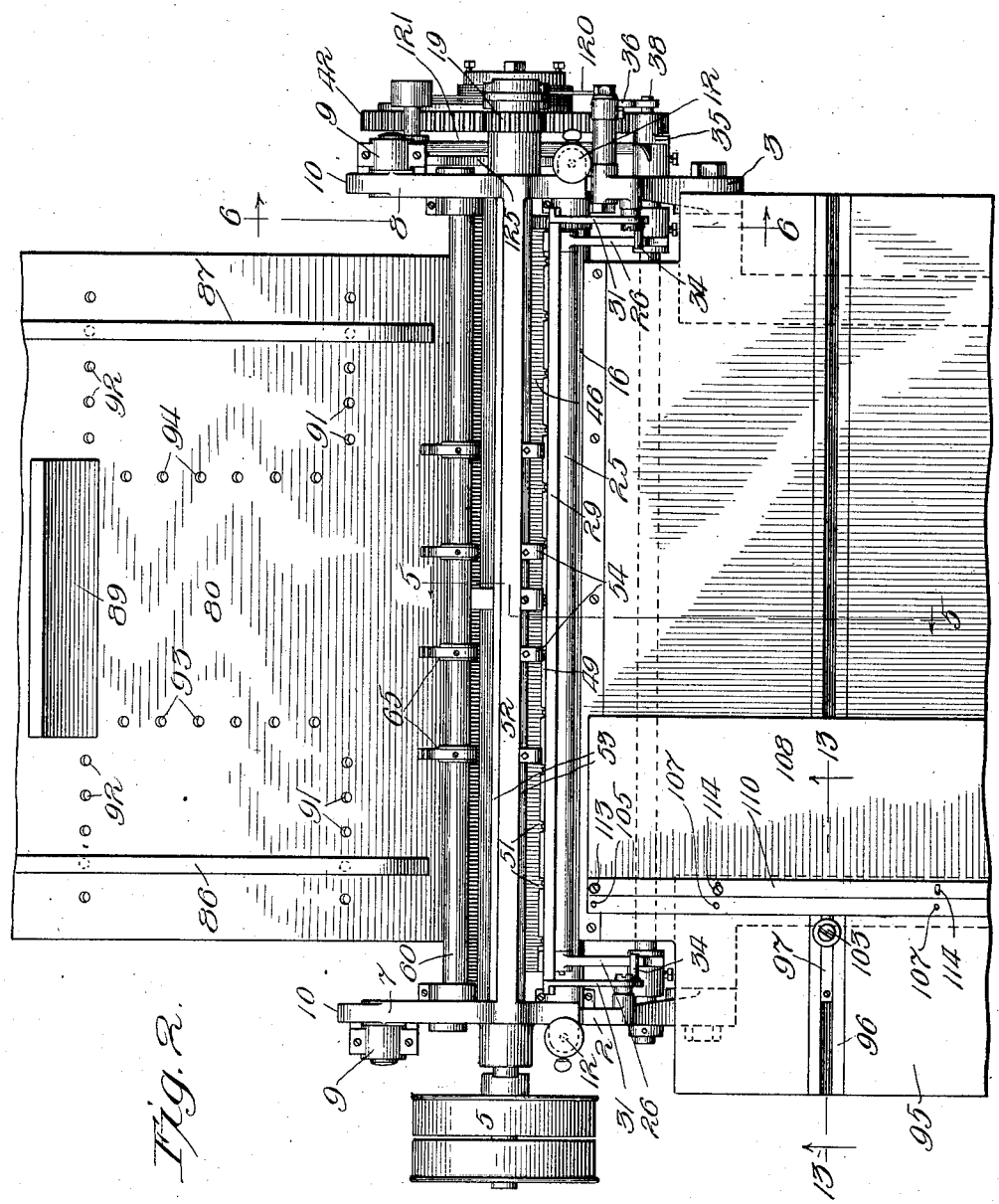
Figure 3:
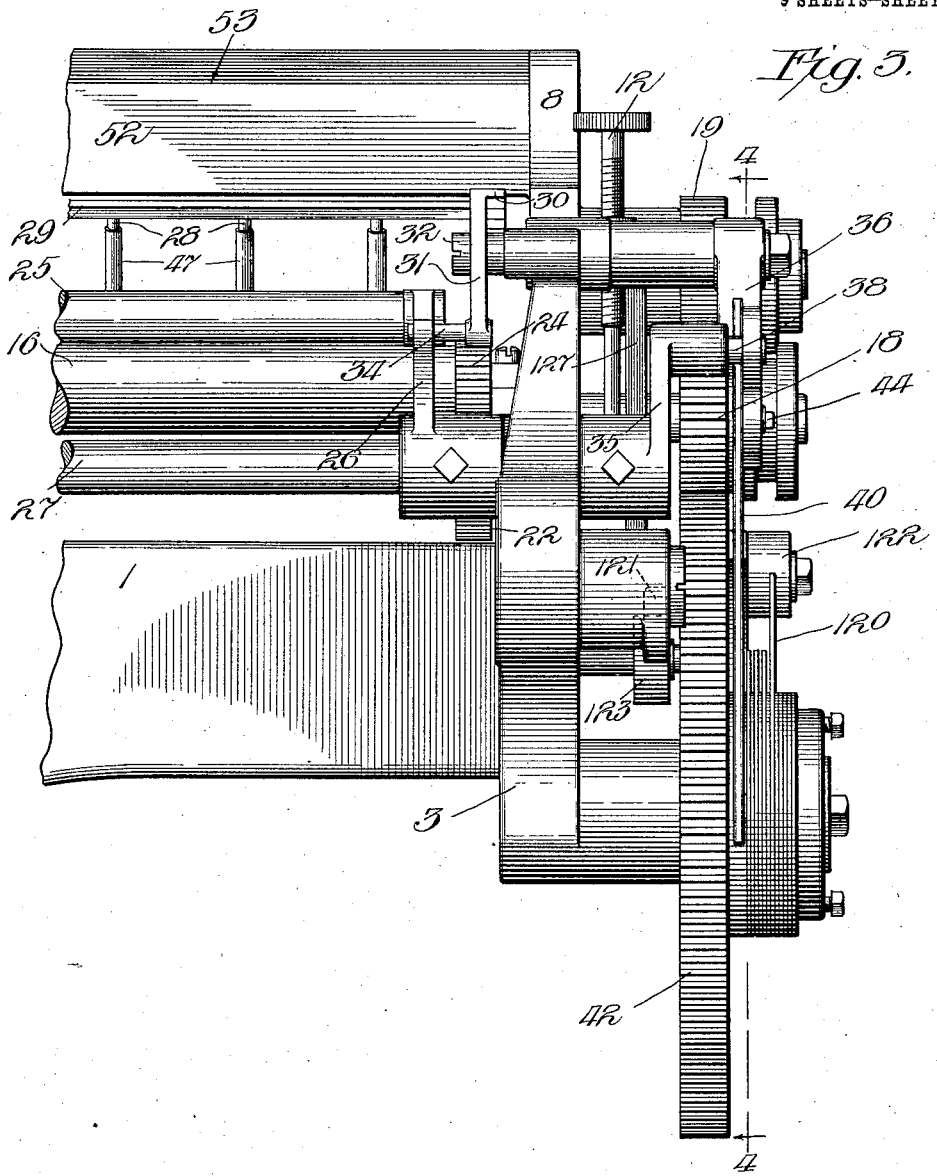
Figure 4:
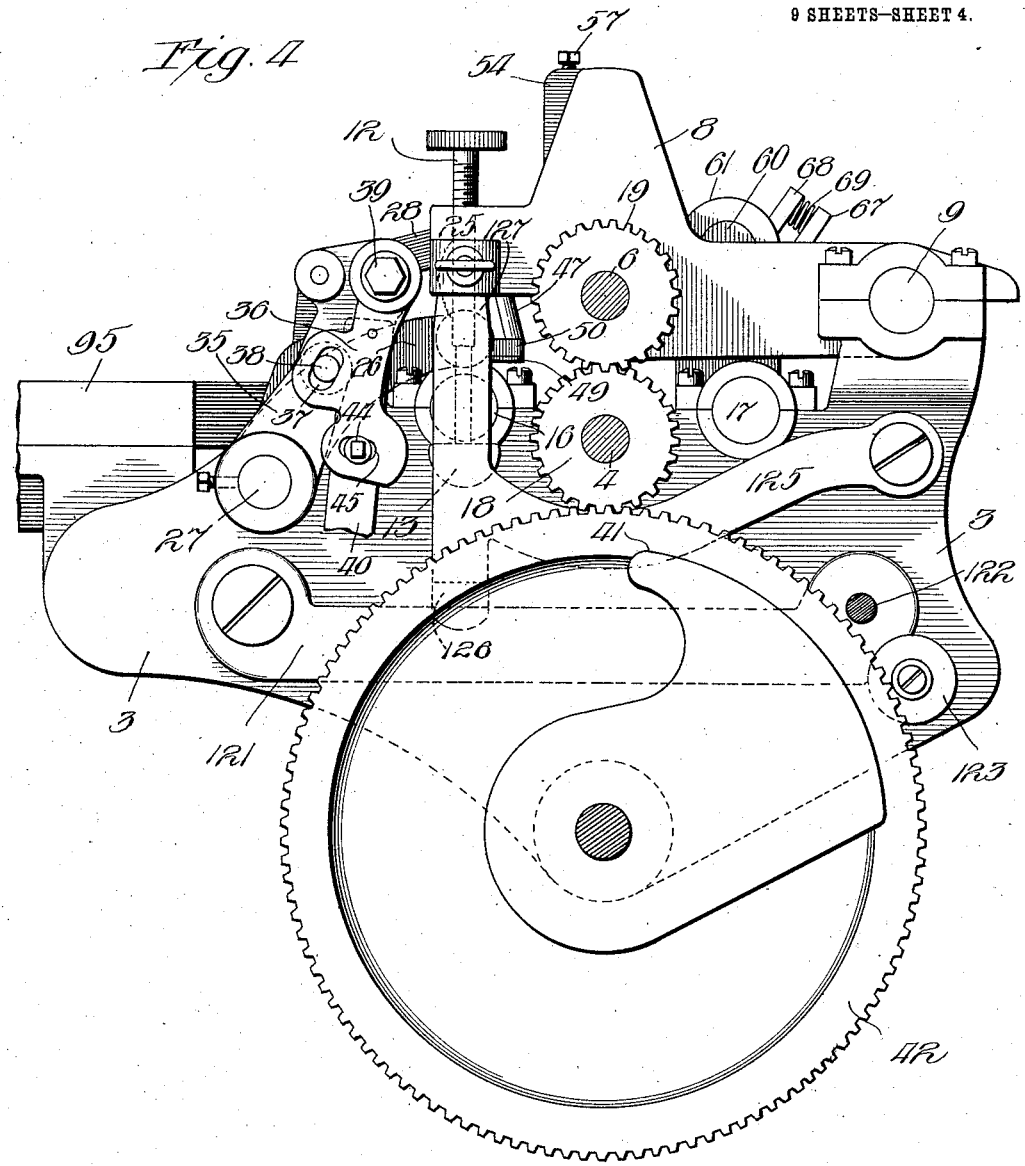

The various features of novelty whereby my invention is characterized will hereinafter be pointed out with particularity in the claims; but, for a full understanding of my invention and of its various objects, including those heretofore enumerated, reference may be had to the following detailed description taken in connection with the accompanying drawings, wherein:

Figure 1 is a side view of a machine arranged in accordance with a preferred form of my invention; Fig. 2 is a top plan view of the machine, the extreme ends of the feed table and of the "lay boy" being broken away; Fig. 3 is a view on an enlarged scale of the right hand portion of the machine as viewed from the left in Fig. 1; Fig. 4 is a section on line 4—4 of Fig. 3; Fig. 5 is a section on line 5—5 of Fig. 2, the scale being the same as that of Figs. 3 and 4; Fig. 6 is a section on line 6—6 of Fig. 2; Fig. 7 is a section on line 7—7 of Fig. 5; Figs. 8 and 9 are details of one of the smoothing or ironing devices; Figs. 10 and 11 are details showing the striker, the primary feed rolls, and the means for operating the same; Fig. 12 is a detail of one of the striker pins or fingers; Fig. 13 is a section on line 13—13 of Fig. 2; Fig. 14 is a plan view of the frame member forming part of the adjustable and reversible gage on the feed table; Fig. 15 is a view looking toward the right in Fig. 13; Fig. 16 is a section on line 16—16 of Fig. 15; Fig. 17 is a plan view on a reduced scale of the plate which forms part of the gage on the feed table; Figs. 18 and 19 are details of a modified form of smoothing or ironing member; Fig. 20 is a detail showing means for locking down the shaft which carries the male cutting member or creasing device; Fig. 21 is a top view of the locking plate shown in Fig. 20; and Figs. 22 and 23 are broken plan and side views of a modified feed gage.

Referring to the drawings, 1 represents a pedestal having on its upper end two parallel frame members 2 and 3, these three parts forming the main frame of the machine. It will of course be understood that any other suitable frame structure may be employed.

4 is a main shaft extending horizontally between the frame members 2 and 3 and having on one end suitable driving means such as pulleys 5. The main shaft serves also as a shaft for supporting the die members of the cutting or creasing devices. Above the shaft 4 is arranged a shaft 6, this being mounted in swinging frame members 7 and 8. As will best be seen in Figs. 2, 4 and 6, each of the members 7 and 8 is hinged at one end in a suitable bearing as indicated at 9. Lugs 10 on the swinging frame members, coöperating with lugs 11 on the stationary frame members limit the swinging movement of the movable frame members in the direction to carry the shaft 6 away from the shaft 4; the arrangement being preferably such that when the swinging frame members are swung back as far as they will go they will be held by gravity with the lugs 10 and 11 in engagement with each other, holding the shaft 6 in a position which will give convenient access thereto. The angular movement of the members 7 and 8 in the opposite direction is limited by means of long set screws 12 which are adjustably carried thereby and are adapted to rest upon lugs 13 projecting outwardly from the sides of the stationary frame members. By adjusting the screws 12 the distance between the shafts 4 and 6 when the swinging frame is down may be varied.

The shaft 6 is adapted to carry cutting or creasing members complementary to those mounted on the shaft 4, these taking any usual or preferred forms. In the arrangement shown, (see Fig. 5), the main shaft carries the female members 14 of the cutting devices, the male members 15 being mounted on the shaft 6. These cutting members, or creasing members where it is desired to crease the paper, may be adjustably mounted upon shafts in any suitable way.

In front of the shafts 4 and 6 is a roller 16 mounted in the stationary portion of the frame so as to lie parallel with the shafts 4 and 6. There is also a roller 17 mounted in the frame in rear of the shafts 4 and 6. The rollers 16 and 17 are respectively the primary feed roller and the smoothing or ironing roller.

The shaft 6 and the rollers 16 and 17 are geared to the main shaft in any suitable way so as to be driven thereby. In the arrangement shown, the end of the main shaft extending beyond the frame member 3 is provided with a gear 18 which is adapted to mesh with a gear 19 on the corresponding end of the shaft 6; these gears being brought into mesh when the swinging frame is lowered and being separated when the swinging frame is raised. On the inside of the frame member 3 there is arranged on the main shaft a gear 20 meshing with idle gears 21 and 22 which in turn mesh respectively with gears 23 and 24; the gears 23 and 24 being secured to the shafts 16ª and 17ª which carry or form parts of the rollers 16 and 17, respectively. I prefer so to proportion the parts that the peripheral speed of the primary feed roller is slightly less than the speed at which the pitch line of the cutters travel while the peripheral speed of the roller 17 is somewhat greater than the speed of a point on the pitch line of the cutters. In this way the cutters tend to draw the paper a little faster than it is fed and thus insure that the paper will be taut; the paper also being drawn taut between the cutters and the ironing roller.

Coöperating with the primary feed roller is a roller 25 supported so that it may be raised and lowered, and running idly in its supports so that it is driven only by a frictional contact with the primary roller or the paper passing between the two rollers. In the arrangement shown, the roller 25 is revolubly mounted between the ends of two arms 26 which are secured at their opposite ends upon a shaft 27 journaled in the main frame so as to lie parallel with the axes of the other shafts and the rollers. By moving the shaft 27 angularly the auxiliary feed roller may be raised away from the primary roller or lowered down upon the same.

Coöperating with the feed rolls is a striker which is adapted to be moved into the path of the paper to arrest the paper when the auxiliary feed roll is up and to be lifted out of the way of the paper when the auxiliary feed roll is lowered and causes the paper to be fed. The striker comprises a series of fingers 28 carried upon a bar 29 which is in turn mounted upon the ends of a pair of swinging arms 30 arranged at opposite sides of the machine. Each of the members 30 may conveniently form one arm of a bell crank lever whose other arm 31 extends down into proximity to one of the arms 26. The bell crank levers are pivotally supported at their elbows upon the main frame of the machine as indicated at 32. Each of the arms 26 is provided with a notch 33 at its top edge and the adjacent arm 31 has a pin 34 which rests in this notch. The parts are so proportioned that the fingers 28 of the striker lie between the feed rolls and the cutting or creasing mechanism. It will be seen that when the auxiliary feed roll is raised the bell crank levers of the striker device are swung so as to lower the fingers while upon a lowering of the auxiliary feed roll the fingers will be raised. It is unnecessary to secure the striker frame permanently to the actuating arms because the parts are so proportioned that the weight of the striker fingers and supporting bar exerts a horizontal pressure on the rear bounding walls of the notches 33 in the arms 26, there being therefore no tendency to lift the pins out of these notches.

The actuating means for the auxiliary feed roll and the striker is best illustrated in Figs. 1, 4, 10 and 11. On the end of the shaft 27 outside of the frame member 3 is an outwardly projecting crank arm 35 lying at the side of a depending swinging member 36. The member 36 is provided with a slot 37 and the member 35 is provided with a pin 38 which extends through the slot. The member 36 is pivotally supported at its upper end, as at 39, in any suitable way. It will be seen that by oscillating the member 36 an angular movement of the rocker arm 35 and consequently an angular movement of the shaft 27 is produced. The member 36 may conveniently be oscillated in one direction by means of a depending rod or bar 40 which is adapted to be engaged by a cam 41 driven from the gear 18 on the main shaft; the gear 18 meshing with a gear wheel 42 of which the cam 41 forms a part or to which it is secured. By this arrangement the cam engages with the rod or bar 40 once during each revolution of the gear wheel 42 and oscillates the shaft 27 in the direction to raise the auxiliary feed roller and lower the striker fingers. This mechanism need be brought into play only when it is desired to form perforations throughout only a part of the length of a sheet for, where the perforations run from end to end of the sheet, the striker is unnecessary. I have therefore provided means for rendering the actuating means for the shaft 27 inoperative when desired; this being accomplished by the simple expedient of making the rod or bar 40 adjustable on the member 36 so that it may be moved on said member into a position which will hold it out of engagement with the cam. In the arrangement shown, the rod or bar is pivotally connected at one end to the member 36 as indicated at 43 and carries at a point separated from its pivot a set screw 44 which passes through an elongated slot 45 in the member 36. By loosening the set screw the rod or bar may be swung into either its operative or idle position where it may be locked by again tightening the screw. For mechanical reasons the cam 41 must have some circumferential length and therefore it may happen that the striker fingers will be brought down upon a sheet of paper which is traveling through the cutting or creasing mechanism. Moreover, it is desirable to have the striker fingers come down before a sheet has passed completely through the cutting or scoring mechanism so that the workman may feed in another sheet which will be ready to enter the cutting or creasing mechanism as soon as the preceding sheet has passed through. It is therefore desirable that the striker fingers be so constructed and arranged that they will not mar or injure the sheet of paper which is being drawn along beneath them by the cutting or creasing mechanism. To this end I have devised a novel arrangement which is best illustrated in Fig. 12. The pins or fingers 28 are not quite long enough to come in contact with the bed 46 lying between the feed rollers and the cutting or creasing mechanism, so that the entire weight of the striker device is not brought to bear upon the paper. On each of the pins or fingers is an elongated thimble 47 preferably closed at its lower end so as to be flat and smooth. Each thimble is loosely held in place on its supporting pin or finger by means of a pin 48 passing into the finger through an elongated vertical slot $48^a$ in the thimble. Consequently each thimble may move vertically on its supporting finger a distance corresponding to the length of the slot therein; the parts being so proportioned that the thimbles drop down upon the bed 46 or upon a sheet of paper overlying the bed and are supported thereby when the striker device is down. The striker device may therefore be lowered upon a sheet of paper passing through the machine without danger of injuring the sheet because the latter bears only the weight of a series of comparatively light thimbles. Consequently it is feasible to lower the striker device before a sheet has passed through the machine, thereby permitting the workman to slip another sheet into engagement with the striker fingers so as to have it ready to enter the perforating or creasing mechanism as soon as the preceding sheet has passed through.

It may sometimes happen that the thimbles of the striker devices will tend to stick to the paper which is being drawn beneath the thimbles while supporting the latter and, to prevent disturbance of the sheet from this cause, I have provided a stripping plate 49 which extends transversely across the machine and is supported upon lugs 50 projecting from the ends of the arms 26; the plate being provided with openings or slots 51 through which the thimbles must pass whenever they are raised. Consequently if the paper sticks to one of the thimbles it can be drawn up only until it engages with the stripping plate, its upward movement being arrested and the thimble disengages itself. In Fig. 11 I have shown the striker device lowered, the stripping plate being now at a considerable distance above the supporting bed 46. As the striker fingers rise the stripping plate descends so that the relative positions when the striker device is raised is that indicated in Fig. 5. Therefore if the paper has been lifted by one of the thimbles the stripping plate not only arrests the paper but positively lowers it again upon the bed.

It is also necessary to provide a stripper for freeing the paper from the perforating member 15 and one of the features of my invention relates to a novel device for performing this operation in a more satisfactory manner than that illustrated in the aforesaid patent. This feature of my invention is best illustrated in Fig. 5. On the swinging frame of the machine above the shaft 6 is arranged a transverse bar 52 preferably having dove-tailed members 53 extending along the sides thereof. On the dove-tailed member on the front side of the machine are placed clamps 54 having curved portions 55 which pass around in front of the perforating wheels 15 and carry stripping plates 56 on their lower ends. There are as many of these clamps as there are perforating wheels and they may be adjusted transversely of the machine by simply loosening the set screws 57 and sliding them along the dove-tailed bar, being locked in their adjusted positions by tightening the set screws. The stripping plates are preferably made of spring metal provided with slots 58 through which the perforating wheels project. It will thus be seen that the stripping plates are rigidly supported at their front ends and have their rear ends, which lie behind the perforating wheels, free. Therefore the paper can readily be fed beneath the stripping plate and into the perforating mechanism as there is no danger that it will come in contact with a vibrating free end of the plate. The free end of the stripping plate acts as a spring which exerts a yielding pressure down upon the paper as the latter tends to rise with the cutting teeth on the wheel and positively presses the paper down clear of the wheel. I prefer to curve the stripping plates in the manner illustrated, the plates bending downward just at the points where the perforating wheels leave the coöperating members, so that the stripping begins at the earliest possible moment.

After the paper has passed through the perforating mechanism, the slight bur or roughness left by this mechanism must be removed and I accomplish this by means of the main smoothing roll 17 coöperating with a series of auxiliary rollers equal in number to the number of perforating devices. To this end I have mounted above the smoothing roll 17 a shaft 60 which is preferably fixed between the upper ends of standards 61 secured to the stationary framework of the machine. The standards may conveniently form the caps or upper halves of the bearings 62 for the ends of the roll 17 or shaft carrying the roll. On the shaft 60 are collars 63 held in place by means of set screws 64. By loosening the set screws the collars may be adjusted angularly of the shaft and also lengthwise thereof. Associated with each of the collars is a holder 65 having in one end a fork 66 for receiving the collar and having a transverse opening therethrough large enough to receive the shaft. Each holder is loose on the shaft and is held against endwise movement by the adjacent collar. The holders and collars are provided with lugs or projections 67 and 68, respectively, the lugs on the holders being arranged in the same transverse planes as the lugs on the collars so that the lugs may coöperate with each other to limit the angular movement of the holders. Between each pair of lugs I place a spring 69 of any suitable type so that each holder has a limited movement against the tension of a spring. The free end of each holder is also provided with a fork as indicated at 70 and in each of these forks is journaled a small smoothing or ironing roller 71 which is adapted to rest upon the main roll 17. The parts are so proportioned and adjusted that the small rollers are yieldingly held upon the smoothing or ironing roll with any desired degree of pressure so that a perforated line in a sheet passing between the main roll and one of the small rollers is pressed smooth. The smoothing is effected not merely by the rolling contact between the small rollers and the main roll but also by a slipping of the main roll under the paper because of the tendency to draw the paper out of the machine faster than it will come.

In Figs. 18 and 19 I have shown a modified form of holder for the small ironing rollers, the holder consisting of a piece of sheet spring metal 72 which is curved so as to constitute a large spring and has flanges or ears 73 bent down on opposite sides of one end thereof to form a pocket in which the roller 71 may be journaled. The opposite end of the holder may be secured to any suitable device for holding it upon a fixed support; there being in the arrangement shown a clamp 74 which is adapted to be adjustably mounted on a dove-tailed bar similar to the bar 52 instead of upon a round shaft as in the other arrangement. I have shown only one shape into which the spring member 72 may be bent, but it will of course be understood that it may take any form so long as it serves as a spring to hold the roller yieldingly upon the coöperating core.

After passing between the smoothing devices the sheets are delivered upon a table or receptacle known as a "lay boy". I prefer to make this in the form of a hinged leaf 80 as best shown in Figs. 1, 2 and 5, the inner end of the leaf being held by means of a hinge or hinges 81 which are in turn secured upon upright posts or standards 82 projecting upwardly from the top of the pedestal of the machine. The leaf may be held at any desired inclination by means of a bar 83 hinged at one end to the underside of the leaf and passing loosely over a projection or set screw 84 on the pedestal. In the under edge of the member 83 are teeth 85 each of which is adapted to receive the projection or set screw and lock the leaf against downward movement. By means of the toothed member 83 the angle of the "lay boy" may be adjusted at will. The size of the sheets which are operated upon in machines of this character is variable and therefore, in order that the sheets may be piled upon each other with a considerable degree of regularity, I have provided means for transforming the "lay boy" into an adjustable receptacle which may be adjusted to fit the size of sheet which is being handled. This can be accomplished by providing two boards or side pieces 86 and 87 having dowel pins 88 on their under edges and an end piece 89 provided with dowel pins 90. The leaf has two transverse rows of holes 91 and 92 and two longitudinal rows of holes 93 and 94. The holes 93 and 94 are spaced apart a distance equal to the distance between the dowel pins on the member 89 so that the member 89 may be placed at any point lengthwise of the leaf. Similarly the holes 91 and 92 are spaced apart a distance equal to the distance between the dowel pins on the members 86 and 87 so that these members may be adjusted transversely of the leaf, thus forming with the adjustable end piece 89 a box of variable length and width.

The paper is adapted to be fed to the machine from a feeding table 95 arranged in front of the feeding rollers. In order that the perforating or creasing may be accurately located on the sheets it is necessary to provide some sort of a guide for properly alining the sheet before it is introduced between the feed rolls. Furthermore it is sometimes necessary to feed from the right hand side of the table and sometimes from the left hand side and therefore the guiding means should be such as to permit either a right hand or a left hand feed. One of the features of my invention consists of a novel feed gage which may be quickly and easily adjusted from a right hand position to a left hand position and vice versa and which would furthermore have the characteristic of affording a nice adjustment so as to permit the creasing or the perforations to be properly dispositioned in the case of sheets in which the lines are arranged at a slight angle to the proper direction. This feature of my invention is best illustrated in Figs. 2 and 13 to 17. Extending transversely across the feed table 95 is a T-slot 96 in which lies loosely a bar 97 adapted to carry the guide device. The bar may of course be shaped to fit the slot so that it can be removed only by sliding it out through one of the ends of the slot, or it may be made of several pieces, as shown, which will permit the main portion of the bar to be lifted out of the top of the slot. In the arrangement shown, the bar is adapted to fit into the reduced portion of the slot and is provided at its ends with two cross pieces 98 secured to the underside thereof and having a length measured transversely of the bar greater than the width of the narrow portion of the slot. Secured on the upper side of the bar and extending at right angles thereto, is a second bar 99, the two bars being rigidly secured together in any suitable manner. On the underside of the bar 97, on opposite sides of the bar 99, are two loose nuts 100 held in place by means of leaf springs 101. The bar 97 is provided with screw-threaded openings 102 extending therethrough in registration with the openings in the nuts 100. The nuts, like the members 98, are longer in the direction transversely of the bar 97 than the width of the bar so that they may serve as clamping means for holding the bar in any position lengthwise of the slot. 103 is a thumb screw which is adapted to be introduced through either the openings 102 for the purpose of coöperating with one or the other of the nuts, depending upon whether the gage is to be used as a left hand gage or as a right hand gage. Near one end of the bar 99 are two screw-threaded openings 104 and 105 arranged one at each side of the bar. At some distance from this same end of the bar 99 are two other holes, 106 and 107, similar to and arranged in the same way as the holes 104 and 105. 108 is a gage plate adapted to lie upon the feed table and having a portion along one of its edges bent up as indicated at 109, the upper edge of the member 109 being provided with a lateral flange 110 lying parallel with the main body of the plate. At each end of the flange is a hole 111, preferably round. At a distance from each of the holes 111 equal to the distance between the holes 104 and 106 in the bar 99 is a hole 112 which is elongated in a direction at right angles to the up-turned portion of the gage plate. In the arrangement of the parts illustrated, the gage is set as a right-hand gage and the plate is secured upon the bar 99 by means of screws 113 and 114, the former passing through one of the openings 111 and into the opening 104, while the latter passes the elongated opening or slot 112 and into the opening 106 in the bar. Suitable spacing devices may be placed between the underside of the flange 110 and the bar 99 so that when the screws are tightened the guide plate will be firmly clamped in place. In the arrangement shown, the portions of the screws lying between the underside of the flange on the guide plate and the bar 99 are surrounded by spacing sleeves or collars 115 and, for the purpose of securing additional stiffness, a stiffening bar 116 may be placed between the sleeves and the flange, extending the entire distance from one screw to the other. It will be seen that when the screw 114 is loosened, the gage plate may be swung about the screw 113 as an axis within the limits of the slot 112, this permitting the gage plate to be adjusted to compensate for inaccuracies in the ruling of the sheets which are to be fed. When it is desired to change the gage from a right-hand gage to a left-hand gage the screws 113 and 114 are removed and the clamping thumb screw 103 is also removed. The gage plate may then be turned end for end and laid upon the left hand side of the bar 99, as viewed in Fig. 13, bringing the second set of holes 111 and 112 in the flange above the holes 105 and 107 in the bar 99. The sleeves 115 and the stiffening bar 116 are then slipped in place and the screws 113 and 114 inserted, clamping the plate in position. The entire gage is then locked at the desired point transversely of the table by introducing the clamping thumb screw into the opening 102 and the nut 100 on the right hand side of the bar as viewed in Fig. 13.

As I have heretofore explained, the swinging frame member carrying the upper cutter shaft is adapted to be lowered and raised for the purpose of permitting the cutters to operate as a sheet is fed through the machine, thus producing a line of perforations, or permitting the paper to pass through without being operated upon. The oscillation of the swinging frame member may conveniently be effected by providing a large gear wheel 42 with a series of cams 120 adapted to be adjusted in various angular positions so as to pass a predetermined point at any desired intervals, each cam or combination of cams having also any desired circumferential length. On the frame of the machine beside the gear wheel 42 is hinged an arm 121 having at its free end a cam roll 122 projecting outwardly into the path of the cams 120. Normally the free end of the arm rests upon the support which may conveniently take the form of a rubber buffer 123. Hinged to the frame of the machine and lying above the arm 121 is a second arm 125 provided with a lug 126 at its free end which rests upon the arm 121. The free end of the member 125 is also provided with an upwardly extending post 127 which engages with the underside of the side member 8 of the swinging frame. The result is that when one or more of the cams 120 is placed in working position and the machine is in operation, the arm 121 will be oscillated, swinging the arm 125 and causing the swinging frame to be raised and lowered. The raising and lowering of the swinging frame during the operation of the machine is required only where a line of perforations is not to extend across the entire length of the sheet, as where the perforations are to begin at a predetermined distance from one end, where they are to stop at a predetermined distance from the other end, or where perforated portions are to be interspersed with unperforated portions. Where the lines of perforations or a crease are to extend across the entire length of a sheet the cams 120 are thrown out of action.

It will be seen that the upper members of the perforators or creasing devices are held down solely by the weight of the swinging frame, this being sufficient for ordinary perforating operations. Sometimes, however, when it is desired to crease stiff or thick paper, the weight of the swinging frame may not be sufficient to hold the upper creasing member firmly enough to give the best results. I have therefore provided a novel arrangement whereby the swinging frame may be quickly and easily locked down when the work demands it. This feature is illustrated in Figs. 20 and 21 of the drawings. The lower ends of the stop screws $12^a$, corresponding to the screws 12, are provided near their lower ends with reduced portions 130 leaving heads 131 at the extreme ends. The lugs $13^a$ on which the lower ends of the screws rest are provided with sockets 132 having a depth equal to the thickness of the heads. On the frame, on each side of the lugs $13^a$ and slightly above the same are outwardly projecting pins 133. 134 is a locking plate having a key-hole slot 135, the plate being longer than the distance between the pins 133. The operation is as follows: When it is desired to lock the swinging frame down, it is first lifted sufficiently to permit the plates 134 to be slipped between the lower ends of the screws $12^a$ and the lugs $13^a$, the large portions of the key-hole slots being brought into registration with the lower ends of the members $12^a$. The swinging frame is then lowered and the locking plates are pushed in so as to bring the reduced necks on the members $12^a$ into the narrow portions of the key-hole slots. The parts are so proportioned that when the plates 134 rest upon the lugs $13^a$ the pins 133 engage with the upper faces of the plates. Consequently after the plates have been pushed in far enough to bring the heads 132 beneath the reduced portions of the key-hole slots, the swinging frame cannot be lifted until the locking plates are again removed.

In Figs. 22 and 23 I have illustrated a somewhat simpler form of feed gage than that heretofore described. Instead of the bar 97 with its detachable elements 98 and 100, I may use a simple bar 97ª shaped to fit the T-slot in the table; the bar being locked in the slot by means of the screw 103 entered into either of the holes 102 as in the other arrangement. Similarly, the bar 99ª, corresponding to the bar 99, may be provided with fixed projections 115ª on its upper side, the holes 104—107 being arranged in these projections, thus dispensing with the loose parts 115.

While I have illustrated and described in detail specific embodiments of the various features of my invention, I do not desire to be limited to these specific embodiments except to the extent indicated by the terms employed in the various definitions of my invention constituting the appended claims.

I claim:

1. In combination, a bed, a striker member movable from and toward the bed from an idle position to a working position, means for supporting said member in its working position, and yieldable devices on said member engaging with the bed in the working position of said member.

2. In combination, a bed, a striker movable from and toward said bed, said striker having yielding members adapted to engage with said bed, and means for supporting the striker at the time said members engage with the bed so as to leave only the pressure of the yieldable members on the bed.

3. In combination, a bed, a striker movable from and toward the bed, fingers on said striker, means for arresting the striker before its fingers engage with said bed, and devices loosely mounted on said fingers and adapted to rest upon the bed in the working position of the striker.

4. A striker having fingers, sleeves loosely mounted on the fingers, and means connecting the sleeves to the fingers so as to permit the sleeves to have a limited endwise movement on the fingers.

5. A striker having fingers, thimbles loosely fitting over the ends of said fingers, and means for permitting limited relative endwise movement between the fingers and the thimbles.

6. A striker having fingers, thimbles loose upon the ends of said fingers, and pin and slot connections between the thimbles and the fingers for permitting relative endwise movements between the thimbles and the fingers.

7. In combination, a bed, means for feeding a sheet over said bed, a striker adapted to be moved into and out of engagement with said bed, the portions of the striker adapted to engage with the bed being yieldable relative to the main portion of the striker.

8. In combination, a bed, means for feeding a sheet over said bed, a striker adapted to be moved into and out of engagement with said bed, the portions of the striker adapted to engage with the bed being yieldable in a direction at right angles to said bed and unyielding in the direction of feed.

9. In combination, a bed, a striker, a stripping device adjacent to said striker, and means for simultaneously raising said striker from said bed and moving said stripping device toward the bed.

10. In combination, a bed, a striker having a series of fingers, a stripping device lying adjacent to said fingers, and means for simultaneously moving said striker so as to carry the fingers away from said bed and moving the stripping device along the fingers toward the bed.

11. In combination, a bed, a striker having a series of fingers, a stripping plate having a series of openings through which said fingers are adapted to pass, and means for moving the striker so as to carry the fingers from and toward said bed and simultaneously moving the stripping plate in the opposite direction.

12. In a machine of the character described, a revoluble main feed roll, an auxiliary feed roll coöperating with the main roll, an oscillatory shaft, arms extending from said shaft and supporting said auxiliary roll at their ends, and means for oscillating the shaft so as to move the auxiliary roll toward and away from the main roll.

13. In a machine of the character described, a revoluble main feed roll, an auxiliary feed roll coöperating with the main roll, an oscillatory shaft, arms extending from the shaft and supporting the auxiliary roll at their ends, a striker behind said rolls, a connection between one of said arms and said striker for causing the striker and the auxiliary roll to move simultaneously in opposite directions, and means for oscillating said shaft.

14. In a machine of the character described, a revoluble main feed roll, an auxiliary feed roll coöperating with the main feed roll, an oscillatory shaft, arms extending from the shaft and supporting the auxiliary roll, a striker behind said rolls, bell-crank levers supporting said striker, one arm of each of said bell-crank levers extending into proximity to one of the aforesaid arms so as to be actuated thereby, and means for oscillating said shaft.

15. In a machine of the character described, a revoluble main feed roll, an auxiliary feed roll coöperating with the main roll, an oscillatory shaft, arms extending from said shaft and supporting the auxiliary roll, a striker lying behind said rolls and pivotally supported above and between said shaft and said auxiliary roll, members projecting down from said striker into proximity to said arms, said arms having notches in their upper edges, pins projecting from said members into said notches, and means for oscillating said shaft.

16. In a machine of the character described, a main feed roll, an auxiliary feed roll coöperating with the main roll, an oscillatory shaft, supports for said auxiliary roll carried by said shaft, a striker behind said rolls, means between said gage and said supports for moving the striker, a rocker arm on said shaft, and means coöperating with said rocker arm for oscillating the shaft.

17. In a machine of the character described, a main feed roll, an auxiliary feed roll coöperating with the main roll, an oscillatory shaft, supports for said auxiliary roll carried by said shaft, a striker behind said rolls, means between said striker and said supports for moving the striker, a rocker arm on said shaft, a member hinged at one end adjacent to said rocker arm, a pin and slot connection between said member and said rocker arm, and a cam device coöperating with said member to oscillate the rocker arm.

18. In a machine of the character described, feed controlling devices including a shaft having a rocker arm, a member pivotally supported at one end and lying adjacent to said rocker arm, means connecting said member and said rocker arm so as to transmit motion from one to the other, a rod or bar pivotally connected to said member, means for locking said rod or bar in one of a plurality of angular positions relative to said member, and a cam device coöperating with said rod or bar to move the same so as to oscillate said shaft.

19. In a machine of the character described, rotary devices for acting upon a sheet passing through the machine, means tending to feed the sheet to said devices at a slightly lower speed than that at which it passes through said devices, and means tending to carry said sheet away from said devices faster than it passes through said devices, each of said means being constructed and arranged to permit the sheet to slip under a predetermined pull so as to maintain the sheet taut without tearing it.

20. In a machine of the character described, a rotary perforating cutter, feed rolls for delivering a sheet to said cutter, rolls for receiving the sheet from the cutter; the parts being so proportioned and arranged that the cutter tends to draw the sheet from the feed rolls faster than the feed rolls tend to deliver it, while the other rolls tend to draw the sheet from the cutter faster than is permitted by the cutter; said rolls being so constructed and arranged as to permit the sheet to slip under a predetermined pull and thus maintain the sheet taut without tearing it.

21. In a machine of the character described, a revoluble perforating cutter, means for feeding a sheet beneath the cutter, and a resilient stripper secured at a point in advance of the cutter and having a free end extending adjacent to the lowermost portion of the cutter toward the rear thereof and adapted to overlie and engage with a sheet passing through the machine, said stripper being bent downwardly at a point slightly in rear of a vertical radius of the cutter.

22. In a machine of the character described, a shaft carrying a revoluble tool, a bar mounted on the machine above and parallel with the shaft, a clamp dove-tailed to the bar so as to be adjustable lengthwise thereof, said clamp extending down in front of said tool, and a resilient stripper secured to the lower end of said clamp and extending adjacent to the tool toward the rear thereof.

23. In a machine of the character described, a movable frame, a tool carried by the frame, two stationary abutments, a member on said frame adapted to engage with one of said abutments to limit the movement of the frame in one direction, and a device adapted to be interposed between said member and the second abutment for locking the frame against movement in the opposite direction.

24. In a machine of the character described, a movable frame, a tool carried by the frame, two stationary abutments, a member on said frame adapted to engage with one of said abutments to limit the movement of the frame in one direction, and a device adapted to be interposed between said member and the second abutment for locking said member against the other abutment.

25. In a machine of the character described, a swinging frame, a tool carried by said frame, means for automatically raising and lowering said frame, a pin on said frame, a stationary abutment for engaging with said pin to limit its movement in one direction, a second stationary abutment, and a locking plate adapted to be interposed between said pin and the latter abutment for locking the frame in its lowermost position.

26. In a machine of the character described, a movable frame, a tool carried by said frame, two stationary abutments, a pin supported by the frame in a position to engage with one of said abutments to limit the movement of the frame in one direction, said pin having a reduced neck near its end, and a locking plate having a key hole slot to receive said reduced neck so as to lock the plate to the pin, said plate being adapted to engage with the other abutment so as to hold the frame against movement in the opposite direction.

27. In combination, a table, a bar mounted on the table so as to be slidable thereon in a transverse direction, a second bar lying upon the table and extending transversely of the first bar, means for rigidly locking said bars together, and an adjustable gage connected to said second bar.

28. In combination, a table having a T-slot extending across the same, a bar slidably mounted in said slot, a member lying on the table and extending transversely across said bar at a point between the ends of the latter, means for rigidly uniting said member to said bar, a feed gage adapted to rest upon the table, said feed gage having a flanged raised portion adapted to rest on said member, and fastening means between said member and said flange for permitting the gage plate to be secured either on the right or on the left of said member so as to serve either as a right-hand gage or a left-hand gage.

29. In combination, a table, a bar mounted on the table so as to be slidable thereon in a transverse direction, a member lying on the table above and transversely of the bar and rigidly secured to the bar at a point between the ends of the latter, a feed gage resting on the table and having at one edge a raised portion provided with a flange resting on said member, means for pivotally connecting said flange to said member so as to permit said gage to be swung in the plane of the table, and means for locking said flange to said member in any one of a plurality of angular positions relative to its pivotal axis.

30. A "lay boy" comprising a bed having parallel rows of holes extending transversely thereof together with parallel rows of holes extending at right angles to the transverse rows, side pieces having pins adapted to be entered in corresponding holes in the transverse rows, and an end piece having pins adapted to enter corresponding holes in the other rows.

31. In a machine of the character described, a revoluble smoothing roll, a shaft supported above and parallel with said roll, a collar adjustably secured upon said shaft, a holder swinging on said shaft and having portions lying on opposite sides of said collar, a roller in the end of said holder adapted to rest upon said roll, and a spring between said holder and said collar for yieldingly holding said roller on said roll.

32. In a machine of the character described, a revoluble smoothing roll, a shaft supported above and parallel with said roll, a collar adjustably secured upon said shaft, a holder swinging on said shaft and having portions lying on opposite sides of said collar, a roller in the end of said holder adapted to rest upon said roll, shoulders on said holder and on said collar, and a spring between said shoulders for yieldingly holding the roller in contact with said roll.

33. In a machine of the character described, a revoluble smoothing roll, a shaft supported in proximity to and lying parallel with said roll, a holder journaled on said shaft, a roller in said holder engaging with said roll, an adjustable collar on the shaft for preventing movement of the holder along the shaft, and a spring acting on the holder for maintaining a yielding contact between the roller and the roll.

In testimony whereof, I sign this specification in the presence of two witnesses.

CHARLES A. BURTON.

Witnesses:
 RUBY V. BRYDGES,
 WM. F. FRENDENREICH.

---

Copies of this patent may be obtained for five cents each, by addressing the "Commissioner of Patents, Washington, D. C."